US011926762B2

(12) United States Patent
Lu et al.

(10) Patent No.: US 11,926,762 B2
(45) Date of Patent: Mar. 12, 2024

(54) HIGH-TEMPERATURE NANO-COMPOSITE COATING AND PREPARATION METHOD THEREOF, AND SMALL BAG FLEXIBLE PACKAGING COATING

(71) Applicant: LUYANG ENERGY-SAVING MATERIALS CO., LTD., Shandong (CN)

(72) Inventors: Chenghong Lu, Shandong (CN); Meihua Xu, Shandong (CN); Weijin Zheng, Shandong (CN); Yaohui Yue, Shandong (CN); Deli Ren, Shandong (CN); Ming Lu, Shandong (CN)

(73) Assignee: LUYANG ENERGY-SAVING MATERIALS CO., LTD., Shandong (CN)

( * ) Notice: Subject to any disclaimer, the term of this patent is extended or adjusted under 35 U.S.C. 154(b) by 0 days.

(21) Appl. No.: 17/780,505

(22) PCT Filed: Nov. 9, 2021

(86) PCT No.: PCT/CN2021/129495
§ 371 (c)(1),
(2) Date: May 26, 2022

(87) PCT Pub. No.: WO2022/100565
PCT Pub. Date: May 19, 2022

(65) Prior Publication Data
US 2023/0068922 A1    Mar. 2, 2023

(30) Foreign Application Priority Data
Nov. 10, 2020 (CN) .......................... 202011246887.4

(51) Int. Cl.
*C09D 7/61* (2018.01)
*B82Y 30/00* (2011.01)
(Continued)

(52) U.S. Cl.
CPC ................ *C09D 7/61* (2018.01); *B82Y 30/00* (2013.01); *C09D 1/00* (2013.01); *C09D 7/63* (2018.01); *C09D 7/70* (2018.01)

(58) Field of Classification Search
None
See application file for complete search history.

(56) References Cited

U.S. PATENT DOCUMENTS 3,051,669 A * 8/1962 Emblem ................. B22C 1/167
524/45
4,279,946 A * 7/1981 Derbyshire ............... B22C 3/00
427/155
(Continued)

FOREIGN PATENT DOCUMENTS

CN      1186298 C      1/2005
CN    101240125 A      8/2008
(Continued)

OTHER PUBLICATIONS

CN-109054467-A, English translation (Year: 2018).*
(Continued)

*Primary Examiner* — Stefanie J Cohen
(74) *Attorney, Agent, or Firm* — Yue (Robert) Xu; Apex Attorneys at Law, LLP

(57) ABSTRACT

The present disclosure provides a high-temperature nano-composite coating and a preparation method thereof, and a small bag flexible packaging coating. The high-temperature nano-composite coating provided by the present disclosure controls the fiber length. Moreover, high-temperature reinforcing filler and high-temperature expansion filler are introduced, to make the coating have ultra-high strength at high temperature without cracks caused by shrinkage at high-temperature. In addition, nanopowder, high-temperature skeleton filler and other additives are introduced to make the coating be uniform and stable and reach a slurry state similar (Continued)

to toothpaste. There is no precipitation and stratification during the placement process. Small packaging can be realized to facilitate construction and operation. Besides, the coating has a good bonding to furnace lining, and will not fall off from the furnace lining, thereby prolonging the service life of the furnace lining.

5 Claims, 1 Drawing Sheet

(51) Int. Cl.
*C09D 1/00* (2006.01)
*C09D 7/40* (2018.01)
*C09D 7/63* (2018.01)

(56) References Cited

U.S. PATENT DOCUMENTS

| | | | | |
|---|---|---|---|---|
| 5,628,813 | A * | 5/1997 | Chen | C05G 5/37 71/64.11 |
| 9,767,944 | B2 * | 9/2017 | Galland | C01G 49/0072 |
| 2003/0106687 | A1 * | 6/2003 | Adams | C09K 8/54 166/105 |
| 2004/0109853 | A1 * | 6/2004 | McDaniel | C09D 5/34 424/94.63 |
| 2011/0094419 | A1 | 4/2011 | Fernando et al. | |
| 2013/0189493 | A1 | 7/2013 | Decker | |
| 2017/0349769 | A1 | 12/2017 | Geise et al. | |
| 2021/0002771 | A1 * | 1/2021 | Jin | C09D 7/61 |
| 2022/0411329 | A1 | 12/2022 | Xu et al. | |

FOREIGN PATENT DOCUMENTS

| | | | | | |
|---|---|---|---|---|---|
| CN | 101429350 | A | * | 5/2009 | |
| CN | 102464933 | A | | 5/2012 | |
| CN | 102731052 | A | * | 10/2012 | ....... C04B 35/62222 |
| CN | 102898166 | A | | 1/2013 | |
| CN | 102924099 | A | | 2/2013 | |
| CN | 103396141 | A | | 11/2013 | |
| CN | 102256600 | B | | 7/2014 | |
| CN | 105565835 | A | | 5/2016 | |
| CN | 107793800 | A | | 3/2018 | |
| CN | 108794021 | A | | 11/2018 | |
| CN | 109054467 | A | * | 12/2018 | |
| CN | 109054467 | A | | 12/2018 | |
| CN | 109650882 | A | | 4/2019 | |
| CN | 111039684 | A | | 4/2020 | |
| CN | 111621175 | A | | 9/2020 | |
| CN | 112280343 | A | | 1/2021 | |
| EP | 0377882 | A1 | | 7/1990 | |
| EP | 4026818 | A1 | | 7/2022 | |
| JP | 2003192472 | A | | 7/2003 | |
| JP | 2019522698 | A | | 8/2019 | |
| RU | 2409606 | C2 | | 1/2011 | |
| UA | 19688 | A | | 12/1997 | |
| WO | 2017073115 | A1 | | 5/2017 | |
| WO | WO-2018152328 | A1 | * | 8/2018 | ....... C04B 35/62222 |

OTHER PUBLICATIONS

CN-101429350-A—English translation (Year: 2009).*
CN-102731052-A—English translation (Year: 2012).*
International Search Report for PCT/CN2021/129495 dated Dec. 29, 2021, ISA/CN.
CNIPA First Office Action corresponding to Application No. 202011246887.4 dated Jul. 7, 2021.
Development of water-based vanishing mold coating, Molding material, the first issue of the year 1998, Xu Qingbai et al, pp. 22-25.
The European Search Report dated Dec. 14, 2022 for EP21870525.9.
The Russian 1st Office Action dated Sep. 30, 2022 for RU2022112881.
The Japanese 1st Office Action dated Nov. 14, 2022 for JP2022-524674.

* cited by examiner

HIGH-TEMPERATURE NANO-COMPOSITE COATING AND PREPARATION METHOD THEREOF, AND SMALL BAG FLEXIBLE PACKAGING COATING

This application is the national phase of International Application No. PCT/CN2021/129495, titled "HIGH-TEMPERATURE NANO-COMPOSITE COATING AND PREPARATION METHOD THEREOF, AND SMALL BAG FLEXIBLE PACKAGING COATING", filed on Nov. 9, 2021, which claims the priority to Chinese Patent Application No. 202011246887.4, titled "HIGH-TEMPERATURE NANO-COMPOSITE COATING AND PREPARATION METHOD THEREOF, AND SMALL BAG FLEXIBLE PACKAGING COATING", filed on Nov. 10, 2020 with the China National Intellectual Property Administration, which is incorporated herein by reference in entirety.

FIELD

The present disclosure relates to the field of high-temperature furnace coatings, and specifically relates to a high-temperature nano-composite coating and a preparation method thereof, and a small bag flexible packaging coating.

BACKGROUND

The ethylene cracking furnace in the petrochemical industry, especially within three meters from the bottom, is used at high temperatures, and has bottom firing, side firing, and top firing burners. Affected by airflow scouring and atmosphere, the requirement for the strength of the furnace lining is extremely high. Therefore, brick wall structure has been used in this part. The brick wall structure can withstand the scouring of airflow and the erosion of atmosphere. However, due to its high thermal conductivity and poor thermal shock, the outer wall of the furnace is at a high temperature, and extremely easy to break and fall.

As the country's requirements for environmental protection are getting higher and higher, in order to improve energy efficiency and prolong the service life of the furnace, many high-temperature furnace manufacturers have gradually adopted full-fiber furnace linings instead of brick walls and castable structures to resist the corrosion of fiber furnace linings in various harsh environments in the furnace. However, since the fiber module with good insulation performance and heat shock resistance is easily disintegrated due to the influence of the environmental atmosphere, it cannot resist the scouring of the air flow, and thus cannot be applied to the high temperature furnace with high wind speed. As a result, it is necessary to spray a layer of high-temperature thermal protection coating that has high strength and good permeability, and firmly bonds to the furnace lining on the surface of the fiber furnace lining for protection. In order to make the high-temperature thermal protection coating and the fiber furnace lining more firmly bond without falling off, it is necessary to root and anchor the high temperature thermal protection coating on the fiber furnace lining by drying and high temperature firing to firmly anchor the coating on the surface of the fiber furnace lining. In addition, it is necessary to repair the cracks and gaps of some damaged furnace lining. As these construction sites are relatively small and have a certain depth, the ordinary coating construction method used for construction cannot fully pour the coating to a certain depth and fails to achieve the construction effect. Therefore, only glue gun can be used for construction. The high-temperature resistant coatings used in the fire-resistant and thermal insulation industry are generally packaged in plastic drums or iron drums, which will be troublesome to open and easily cause waste, making it very inconvenient for customers. In addition, when the glue gun is used for construction, manual filling is required on site, which is time-consuming and laborious, and hard to maintain the on-site sanitation, which brings inconvenience. However, these problems would be solved if small bag flexible packaging is used.

The high-temperature mechanical properties of the existing high-temperature resistant coatings are still poor when used in ethylene cracking furnaces, so that they cannot withstand the super scouring force of the cracking furnace, and cannot meet the purpose of protecting the full-fiber furnace lining from the erosion of the harsh environment in the furnace. Besides, because it is a high-temperature resistant material in which usually inorganic high-temperature resistant powder fillers or fibers are used, the coating does not have a delicate feeling. Therefore, after being left for a period of time, the coating in the small bag flexible packaging will precipitate and separate a layer of liquid. When a glue gun is used for construction, the liquid comes out quickly, and dry long fibers and granular powder are left, which is difficult to be squeezed out with a glue gun. FIG. 1 shows a schematic diagram of the slurry state of the existing high-temperature resistant coating after being left for a period of time.

SUMMARY

In view of this, a purpose of the present disclosure is to provide a high-temperature nano-composite coating and a preparation method thereof, and a small bag flexible packaging coating. The high-temperature nano-composite coating provided by the present disclosure has high strength and good permeability, making it more firmly bond to the furnace lining. The coating is uniform and stable, delicate and smooth, and will not precipitate for a long time. Through the gradation control of fiber length and powder particle size, high-temperature mechanical properties are improved, high-temperature shrinkage is reduced, and the fastness of bonding to the furnace lining is improved.

The present disclosure provides a high-temperature nano-composite coating, comprising the following components in mass ratio:
high-temperature resistant inorganic fiber 10%~50%;
reinforcing filler 10%~20%;
high-temperature expansion filler 5%~15%;
skeleton filler 7%~30%;
nanopowder 3%~10%;
inorganic suspending agent 0%~20%;
inorganic binder 10%~50%;
organic additive 3%~15%; and
water accounting for 10%~50% of a total mass of all the above components;
wherein a length of the high-temperature resistant inorganic fiber is 0.01~1 mm.

Preferably, the nanopowder is selected from one or more of nano silica and nano alumina powder.

Preferably, the high-temperature resistant inorganic fiber is selected from one or more of high-alumina fiber, zirconium-containing fiber and alumina crystal fiber.

Preferably, the reinforcing filler is selected from one or more of acicular microsilica powder and pyrophyllite powder.

Preferably, the high-temperature expansion filler is selected from one or more of kyanite powder and sillimanite.

Preferably, the skeleton filler is selected from one or more of alumina powder, mullite powder, zircon powder and corundum powder.

Preferably, the inorganic suspending agent is bentonite;

The inorganic binder is selected from one or more of aluminum sol, aluminum dihydrogen phosphate and silica sol.

Preferably, the organic additive is selected from one or more of an organic binder, an antiseptic and an antifreeze agent.

The present disclosure also provides a method for preparing the high-temperature nano-composite coating described in the above technical solutions, comprising:

S1. mixing a high-temperature resistant inorganic fiber, an inorganic binder and water to obtain a fiber dispersion;

S2. mixing the fiber dispersion with a high-temperature expansion filler, a reinforcing filler and a skeleton filler to obtain a slurry; and S3. mixing the slurry with a nanopowder, an inorganic suspending agent and an organic additive to obtain a coating.

The present disclosure also provides a small bag flexible packaging coating, wherein the coating is the high-temperature nano-composite coating described in the above technical solutions or the high-temperature nano-composite coating prepared by the method described in the above technical solutions.

The present disclosure provides a high-temperature nano-composite coating, in which fiber is pretreated to control the fiber length, and high-temperature reinforcing filler, high-temperature expansion filler, nanopowder, inorganic suspending agent, and other additives are introduced. Through these improvements, the obtained high-temperature nano-composite structure coating has the following characteristics: (1) It has ultra-high strength and compactness at high temperature, small shrinkage, no cracks generated at high temperature, and can withstand the super-strong scouring of airflow and the erosion of atmosphere of the cracking furnace in the petrochemical industry; (2) The introduction of nanopowder makes the coating have more abundant particle size gradation and stronger permeability when sprayed on the surface of the fiber lining, thereby achieving the purpose of a stronger bonding to the fiber lining; (3) Through the gradation control of fiber length and powder particle size and the introduction of an inorganic suspending agent and other additives, the coating is uniform and stable, delicate and smooth, and can reach a slurry flow state similar to toothpaste when extruded, avoiding precipitation and stratification during the placement process. Small packaging can be realized, and an inverted hammer shape can be formed when anchoring and rooting at the bottom of the fiber module; (4) The coating has good permeability, good bonding to the furnace lining after spraying, and special anchoring and rooting performance, making the bonding of the coating and the furnace lining dually firm, thereby effectively resisting airflow scouring and prolonging the service life of the furnace lining.

The experimental results show that the high-temperature nano-composite coating provided by the present disclosure had no precipitation after being placed for 6-12 months, maintained a uniform paste shape, and had a compressive strength after firing of ≥3 MPa, a rupture strength after firing of ≥2 MPa, and a heating linear shrinkage (1300° C.×24 h) of ≤2%.

DETAILED DESCRIPTION

Figure 1:
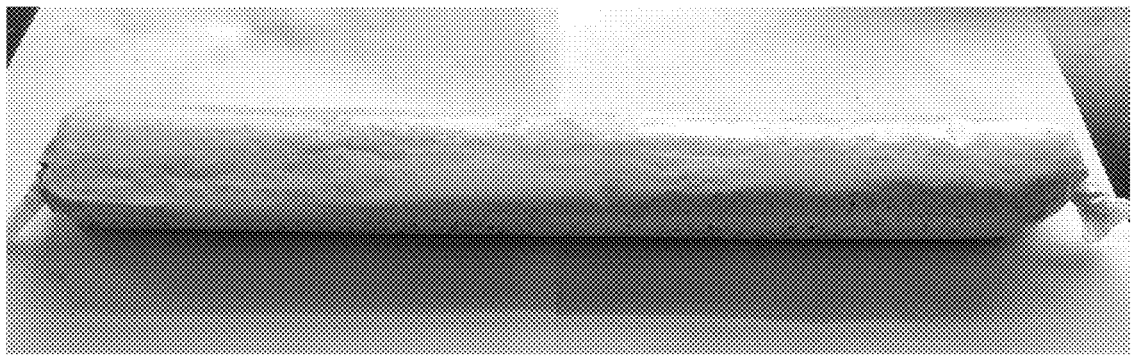
FIG. 1 is a picture showing the stability test of the existing high-temperature resistant coating.

The present disclosure provides a high-temperature nano-composite coating, comprising the following components in mass ratio:

high-temperature resistant inorganic fiber 10%~50%;
reinforcing filler 10%~20%;
high-temperature expansion filler 5%~15%;
skeleton filler 7%~30%;
nanopowder 3%~10%;
inorganic suspending agent 0%~20%;
inorganic binder 10%~50%;
organic additive 3%~15%; and
water accounting for 10%~50% of a total mass of all the above components;
wherein a length of the high-temperature resistant inorganic fiber is 0.01~1 mm.

The present disclosure performs pretreatment on fiber to control the fiber to a specific length, and further introduces high-temperature reinforcing filler and high-temperature expansion filler, so that it has ultra-high strength at high temperature without cracks caused by shrinkage at high-temperature, achieving the purpose of withstanding the super-strong scouring force of the cracking furnace and meeting the purpose of protecting the full-fiber furnace lining from the erosion of the harsh environment in the furnace. The introduction of nanopowder makes the coating have more abundant particle size gradation and stronger permeability when sprayed on the surface of the fiber lining, thereby achieving the purpose of a stronger bonding to the fiber lining. Through the gradation control of fiber length and powder particle size and the introduction of an inorganic suspending agent and other additives, the coating is uniform and stable, and reaches a slurry state similar to toothpaste, avoiding precipitation and stratification during the placement process. Small packaging can be realized to facilitate construction and operation. Besides, the coating has a good bonding to furnace lining, and will not fall off from the furnace lining, thereby prolonging the service life of the furnace lining.

In the present disclosure, the raw material of the high-temperature resistant inorganic fiber is preferably one or more of high-alumina fiber, zirconium-containing fiber and alumina crystal fiber. Among them, the alumina crystal fiber is preferably one or more of 72 alumina crystal fiber, 80 alumina crystal fiber and 95 alumina crystal fiber.

In the present disclosure, the high-temperature resistant inorganic fiber is secondary processed fiber. The present disclosure controls the length of the fiber through processing. In the present disclosure, the length of the obtained high-temperature resistant inorganic fiber is 0.01~1 mm; and the diameter of the high-temperature resistant inorganic fiber is preferably 1~6 um.

In the present disclosure, the mass percentage of the high-temperature resistant inorganic fiber in the coating is 10%~50%, preferably 15%~30%; in some embodiments of the present disclosure, the mass ratio is 15%, 20%, 25% or 30%.

In the present disclosure, the reinforcing filler is a high-temperature resistant reinforcing filler, preferably one or more of acicular microsilica powder and pyrophyllite powder. Among them, the aspect ratio of the acicular microsilica powder is preferably (15~20):1. The particle size of the pyrophyllite powder is preferably 200~300 mesh. In the present disclosure, there is no special restriction on the source of the high-temperature reinforcing filler, and it may be a general commercial product.

In the present disclosure, the mass percentage of the reinforcing filler in the coating is 10%~20%; in some embodiments of the present disclosure, the mass ratio is 10%, 13%, 15% or 20%.

In the present disclosure, the high-temperature expansion filler is preferably one or more of kyanite powder and sillimanite. In the present disclosure, there is no special restriction on the source of the high-temperature expansion filler, and it may be a general commercial product. In the present disclosure, the mass percentage of the high-temperature expansion filler in the coating is 5%~15%; in some embodiments of the present disclosure, the mass ratio is 5%, 8% or 12%.

In the present disclosure, the skeleton filler is a high-temperature resistant skeleton filler, preferably one or more of alumina powder, mullite powder, zircon powder and corundum powder. In the present disclosure, the particle size of the framework filler is preferably 300-1000 mesh. In the present disclosure, there is no special restriction on the source of the skeleton filler, and it may be a general commercial product.

In the present disclosure, the mass percentage of the skeleton filler in the coating is 7%~30%; in some embodiments of the present disclosure, the mass ratio is 7%, 10% or 15%.

In the present disclosure, the nanopowder is preferably one or more of nano silica and nano alumina powder. In the present disclosure, the particle size of the nanopowder is preferably 1~100 nm. In the present disclosure, there is no special restriction on the source of the nanopowder, and it may be a general commercial product.

In the present disclosure, the mass percentage of the nanopowder in the coating is 3%~10%; in some embodiments of the present disclosure, the mass ratio is 3%, 5% or 8%.

In the present disclosure, the inorganic suspending agent is preferably bentonite. In the present disclosure, the mass percentage of the inorganic suspending agent in the coating is 0%~20%; in some embodiments of the present disclosure, the mass ratio is 0% or 5%.

In the present disclosure, the inorganic binder is preferably one or more of aluminum sol, aluminum dihydrogen phosphate and silica sol. In the present disclosure, the mass percentage of the inorganic binder in the coating is 10%~50%; in some embodiments of the present disclosure, the mass ratio is 25%, 37%, 40% or 41%.

In the present disclosure, the organic additive is preferably one or more of an organic binder, an antiseptic and an antifreeze agent; more preferably, the organic additive is an organic binder, an antiseptic and an antifreeze agent. Among them, the organic binding agent is preferably one or more of starch, dextrin and cellulose. The antiseptic is preferably Biocide. The antifreeze agent is preferably ethylene glycol.

In the present disclosure, the mass percentage of the organic additive in the coating is 3%~15%; in some embodiments of the present disclosure, the mass ratio is 3% or 5%.

In the present disclosure, the total mass of the above high-temperature resistant inorganic fiber, reinforcing filler, high-temperature expansion filler, skeleton filler, nanopowder, inorganic suspending agent, inorganic binder and organic additive are preferably 100%. In addition to the above components, the coating system also comprises water; in the present disclosure, the amount of water is 10%-50% of the total amount of all the above components except water; in some embodiments of the present disclosure, the amount of water is 15%, 25%, 30% or 35%.

In the high-temperature nano-composite coating provided by the present disclosure, the fiber length and dispersion mode are controlled, and a specific reinforcing filler and a high-temperature expansion filler are introduced, so that the coating has ultra-high strength at high temperature without cracks caused by shrinkage at high-temperature. In addition, certain skeleton filler and nano-structured materials are introduced, and the synergistic effect between the above materials makes the coating state uniform and stable, avoiding precipitation and stratification during the placement process. During high-temperature use, the coating is firmly bonded to the furnace lining, has small high-temperature shrinkage, and has hard crust barrier with ultra-high strength. The coating has small shrinkage after high temperature firing and no cracks, and is firmly bonded to the furnace lining. The coating has high strength after high temperature firing, which can effectively withstand the scouring of airflow and the erosion of atmosphere of bottom firing, side firing and top firing, thereby protecting the fiber module from being corroded by the external environment and being brittle due to disintegration, and preventing the heat loss of the furnace during high-temperature operation, so as to prolong the service life of the furnace lining and reduce the temperature of the outer wall of the furnace, achieving the purpose of energy saving and consumption reduction. The high-temperature nano-composite coating provided by the present disclosure can be used as a special coating for the full-fiber structure of an ethylene cracking furnace, and has ultra-high strength, strong bonding to the fiber lining, and special anchoring state, so as to realize the convenience of construction. Especially in the application of the full-fiber structure instead of the brick wall structure in the ethylene cracking furnace, the coating plays a key role in protecting the fiber, preventing it from being brittle due to disintegration, so as to achieve the ultimate goal of prolonging the service life of the fiber lining and reducing the temperature of the outer wall of the furnace.

The present disclosure also provides a method for preparing the high-temperature nano-composite coating described in the above technical solutions, comprising:
S1. mixing a high-temperature resistant inorganic fiber, an inorganic binder and water to obtain a fiber dispersion;
S2. mixing the fiber dispersion with a high-temperature expansion filler, a reinforcing filler and a skeleton filler to obtain a slurry; and
S3. mixing the slurry with a nanopowder, an inorganic suspending agent and an organic additive to obtain a coating.

Among them, in step S1, the mixing is preferably mixing under stirring; the stirring time is preferably 10~30 min. In step S2, the mixing is preferably mixing under stirring; the stirring time is preferably 3~5 min. In step S3, the mixing sequence is preferably: first adding the nanopowder to the slurry, mixing for 3~5 min under stirring; then adding the inorganic suspending agent, mixing for 5~10 min under stirring; finally adding the organic additive, mixing for 10~20 min under stirring, to obtain a coating.

The present disclosure also provides a small bag flexible packaging coating, wherein the coating is the high-temperature nano-composite coating described in the above technical solutions or the high-temperature nano-composite coating prepared by the method described in the above technical solutions. That is, in addition to using plastic barrels for large packaging, the coating can also be flexible-packaged in small bags to form small bag coating to facilitate the construction of special sites.

The present disclosure also provides a packaging method of the small bag flexible packaging coating described in the above technical solution, comprising: putting the coating into a small bag flexible packaging bag and sealing, to obtain the small bag flexible packaging coating. Among them, the coating is the high-temperature nano-composite coating described in the above technical solutions or the high-temperature nano-composite coating prepared by the method described in the above technical solutions.

The high-temperature nano-composite coating provided by the present disclosure has the following beneficial effects:

1. After high-temperature firing, the coating has high strength, small shrinkage and no cracks. The coating can form a hard and dense crust on the outer layer of the full-fiber furnace lining, which can effectively resist the harsh environment inside the ethylene cracking furnace, and firmly anchor the coating sprayed on the external surface to the fiber lining without falling off.
2. The coating is uniform and stable in a paste form, and will not precipitate and separate liquid during the shelf life. The coating can be packaged in large plastic barrels and can also meet the requirements of small bag flexible packaging so as to be made into small bag flexible packaging for easy construction.
3. The coating is uniform in a paste form, and the composition of the present disclosure makes the paste delicate and makes it have good permeability. The coating has a firm bonding with the fiber lining when sprayed in a large-area. During the process of gluing inside the lining with a glue gun, an inverted hammer shape is automatically formed at the bottom of the perforating furnace lining. Through the formation of this anchoring structure, the coating is more firmly bonded to the furnace lining, so as to achieve the effect of double insurance.

The experimental results show that the high-temperature nano-composite coating provided by the present disclosure reached the following technical indicators:

Chemical composition: $SiO_2$ 20~60%;
$Al_2O_3$ 30~80%;
$ZrO_2$ 5~20.0%;
$Fe_2O_3$<0.3%.
Bulk density after drying at room temperature: 650~850 $Kg/m^3$;
Compressive strength after firing: ≥3 MPa;
Rupture strength after firing: ≥2 MPa;
Heating linear shrinkage: 1300° C.×24 h≤2%.
Placing time: 6-12 months without precipitation.

In order to further understand the present disclosure, the preferred embodiments of the present disclosure will be described below in conjunction with examples. However, it should be understood that these descriptions are only for further illustrating the features and advantages of the present disclosure, rather than limiting the claims of the present disclosure. In the following examples, the size of the raw materials used is in the range of the size parameters of the various raw materials described above.

Example 1

1.1 Formula of Coating
High-temperature resistant inorganic fiber 15%;
High-temperature reinforcing filler—acicular microsilica powder 10%;
High-temperature expansion filler—kyanite powder 12%;
High-temperature skeleton filler—alumina powder 10%;
Nanopowder—nano silica 5%;
Inorganic binder—aluminum sol 40%;
Organic additive—cellulose powder 2%, Biocide 0.7%, ethylene glycol 0.3% 3%;
Inorganic suspending agent—bentonite 5%;
Water accounting for 15% of a total mass of all the above components.

Among them, the raw material fiber of high-temperature resistant inorganic fiber was high-alumina fiber, which was processed into short fiber, and the obtained fiber had a length of 0.01~1 mm and a diameter of 1~5 um.

1.2 Preparation

The high-temperature resistant inorganic fiber was weighed out and added into a mixer. The inorganic binder and water were weighed out, added and stirred for 20 min to fully wet and disperse the fibers. Then the high-temperature expansion filler, reinforcing filler, and skeleton filler were added in sequence. After the addition, the mixture was stirred for 5 min to make it fully disperse. Then the nanopowder was added and stirred for 5 min. The inorganic suspending agent was added and stirred for 10 min to make it fully expand and play a suspending role. Finally, the organic additives were added and stirred for 20 min to obtain the coating.

Example 2

1.1 Formula of Coating
High-temperature resistant inorganic fiber 20%;
High-temperature reinforcing filler—pyrophyllite powder 13%;
High-temperature expansion filler—sillimanite 5%;
High-temperature skeleton filler—mullite powder 15%;
Nanopowder—nano alumina powder 3%;
Inorganic binder—silica sol 41%;
Organic additive—starch powder 2%, Biocide 0.7%, ethylene glycol 0.3% 3%;
Water accounting for 25% of a total mass of all the above components.

Among them, the raw material fiber of high-temperature resistant inorganic fiber was zirconium-containing fiber, which was processed into short fiber, and the obtained fiber had a length of 0.01~1 mm and a diameter of 2~6 um.

1.2 Preparation: The same as in Example 1.

Example 3

1.1 Formula of Coating
High-temperature resistant inorganic fiber 25%;
High-temperature reinforcing filler—acicular microsilica powder 15%;
High-temperature expansion filler—kyanite powder 8%;
High-temperature skeleton filler—zircon powder 7%;
Nanopowder—nano alumina powder 5%;
Inorganic binder—liquid aluminum dihydrogen phosphate 37%;
Organic additive—dextrin powder 2%, Biocide 0.7%, ethylene glycol 0.3% 3%;
Water accounting for 30% of a total mass of all the above components.

Among them, the raw material fiber of high-temperature resistant inorganic fiber was 72 alumina crystal fiber, which was processed into short fiber, and the obtained fiber had a length of 0.01~1 mm and a diameter of 3~6 um.

1.2 Preparation: The same as in Example 1.

Example 4

1.1 Formula of Coating
High-temperature resistant inorganic fiber 30%;
High-temperature reinforcing filler—pyrophyllite powder 20%;
High-temperature expansion filler—sillimanite 5%;
High-temperature skeleton filler—corundum powder 7%;
Nanopowder—nano alumina powder 8%;
Inorganic binder—aluminum sol 25%;
Organic additive—cellulose powder 3.5%, Biocide 1%, ethylene glycol 0.5% 5%;
Water accounting for 35% of a total mass of all the above components.

Among them, the raw material fiber of high-temperature resistant inorganic fiber was 95 alumina crystal fiber, which was processed into short fiber, and the obtained fiber had a length of 0.01~1 mm and a diameter of 3~6 um.

1.2 Preparation: the same as in Example 1.

Example 5

(1) The coatings obtained in Examples 1-2 was put into a small bag flexible packaging and placed at room temperature for 10 months to observe the coating state. Meanwhile, the existing high-temperature resistant coating (model of 1600 high-temperature thermal protection coating, provided by Shandong Luyang Energy-saving Materials Co., Ltd.) was used as a control to conduct the above test.

Figure 2:
FIG. 2 is a picture showing the stability test of the coatings obtained in Examples 1-2 of the present disclosure.

The results are shown in FIG. 2 and FIG. 1, respectively. FIG. 2 is a picture showing the stability test of the coatings obtained in Examples 1-2 of the present disclosure; FIG. 1 is a picture showing the stability test of the existing high-temperature resistant coating. It can be seen that after a long period of placement, the existing coating precipitated and separated, which cannot be used for gluing; whereas the coating of the present disclosure still presented a uniform and delicate paste form without precipitation and liquid separation. The same test was performed on the coatings obtained in other examples. The effect was similar to that of FIG. 2, and excellent uniform and stable properties were also achieved.

Figure 3:
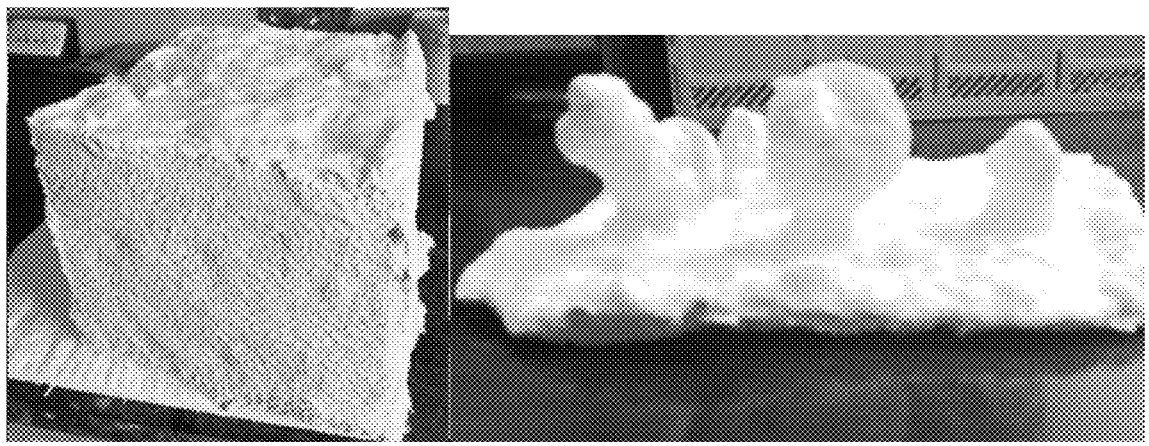
FIG. 3 is a picture showing the structure of the coating gluing of Example 1 of the present disclosure.

(2) The coating obtained in Example 1 was loaded into a glue gun to glue the furnace lining. The structure formed by the coating is shown in FIG. 3. FIG. 3 is a picture showing the structure of the coating gluing of Example 1 of the present disclosure; where the left panel is a picture of the module after being rooted and applied with the coating, and the right panel is a picture showing the shape of the coating after removing the module. The module was rooted and applied with the coating, and then dried and calcined in a high temperature furnace at 1300° C. Then the module was removed, so that the rooted and sprayed coating was exposed. Due to the unique paste-like uniform state of the coating, the coating naturally formed a mace-like drumstick shape at the bottom of the rooting, thereby making the rooting stronger. It can be seen that the coating automatically formed an inverted hammer-shaped structure at the bottom of the perforating furnace, so that the coating was more firmly bonded to the furnace lining. Moreover, it can be seen that after separation from the fiber module, fibers were adhered to the surface of the coating, proving that the coating provided by the present disclosure had a good bonding to the fiber lining.

(3) The coatings obtained in Examples 1-4 were subjected to performance tests. The results were shown in Table 1.

The test of bulk density after drying at room temperature referred to YB/T5200. The calcining condition in the strength test after firing was 1300° C.×3 h; the coating was formed into a test block of length 160 mm×width 40 mm×thickness 40 mm. The performance test was carried out according to the standard YB/T5202.

TABLE 1

Coating performance of Examples 1-4

| | Bulk density after drying at room temperature Kg/m³ | Compressive strength after firing MPa | Rupture strength after firing MPa | Heating linear shrinkage 1300° C. × 24 h % |
|---|---|---|---|---|
| Example 1 | 750 | 5.25 | 3.25 | 1.43 |
| Example 2 | 700 | 6 | 4.5 | 1.35 |
| Example 3 | 680 | 5.85 | 5 | 1.53 |
| Example 4 | 650 | 5.25 | 4.55 | 1.88 |

It can be seen from the above test results that the coating provided by the present disclosure has excellent uniform and stable properties and does not precipitate and separate after long-term placement. In addition, the coating can form an inverted hammer-shaped structure when gluing, thereby improving the fastness to the furnace lining. Moreover, after firing at high temperature, the coating has high strength and small shrinkage, and can better withstand harsh environments.

The above description of the examples is only used to facilitate understanding of the method and core concept of the present disclosure. Various modifications to the embodiments are apparent for the skilled in the art. The general principle defined herein may be implemented in other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:
1. A high-temperature nano-composite coating, comprising the following components in mass ratio:
high-temperature resistant inorganic fiber 15%~30%;
reinforcing filler 10%~20%;
high-temperature expansion filler 5%~15%;
skeleton filler 7%~15%;
nanopowder 3%~10%;
inorganic suspending agent 0%~20%;
inorganic binder 25%~50%;
organic additive 3%~15%; and
water accounting for 10%~50% of a total mass of all the above components;
wherein a length of the high-temperature resistant inorganic fiber is 0.01 mm;
the reinforcing filler is selected from one or more of acicular microsilica powder with an aspect ratio of (15-20):1 and pyrophyllite powder with a particle size of 200-300 mesh;
the high-temperature expansion filler is selected from one or more of kyanite powder and sillimanite;

the skeleton filler is selected from one or more of alumina powder, corundum powder, mullite powder and zircon powder;

the nanopowder is selected from one or more of nano silica and nano alumina powder, and has a particle size of 1-100 nm;

the inorganic suspending agent is bentonite;

the organic additive comprises an antiseptic agent, an antifreeze agent and an organic binder, wherein the antiseptic agent is Biocide, the antifreeze agent is ethylene glycol, and the organic binder is selected from the group consisting of starch, dextrin, cellulose and combinations thereof.

2. The composite coating according to claim 1, wherein the high-temperature resistant inorganic fiber is selected from one or more of high-alumina fiber, zirconium-containing fiber and alumina crystal fiber.

3. The composite coating according to claim 1, wherein the inorganic binder is selected from one or more of aluminum sol, aluminum dihydrogen phosphate and silica sol.

4. A method for preparing the high-temperature nano-composite coating according to claim 1, comprising:
   S1. mixing the high-temperature resistant inorganic fiber, the inorganic binder and the water to obtain a fiber dispersion;
   S2. mixing the fiber dispersion with the high-temperature expansion filler, the reinforcing filler and the skeleton filler to obtain a slurry; and
   S3. mixing the slurry with the nanopowder, the inorganic suspending agent and the organic additive to obtain the coating.

5. A small bag flexible packaging coating, wherein the coating is the high-temperature nano-composite coating according to claim 1.

* * * * *